Figure 1:
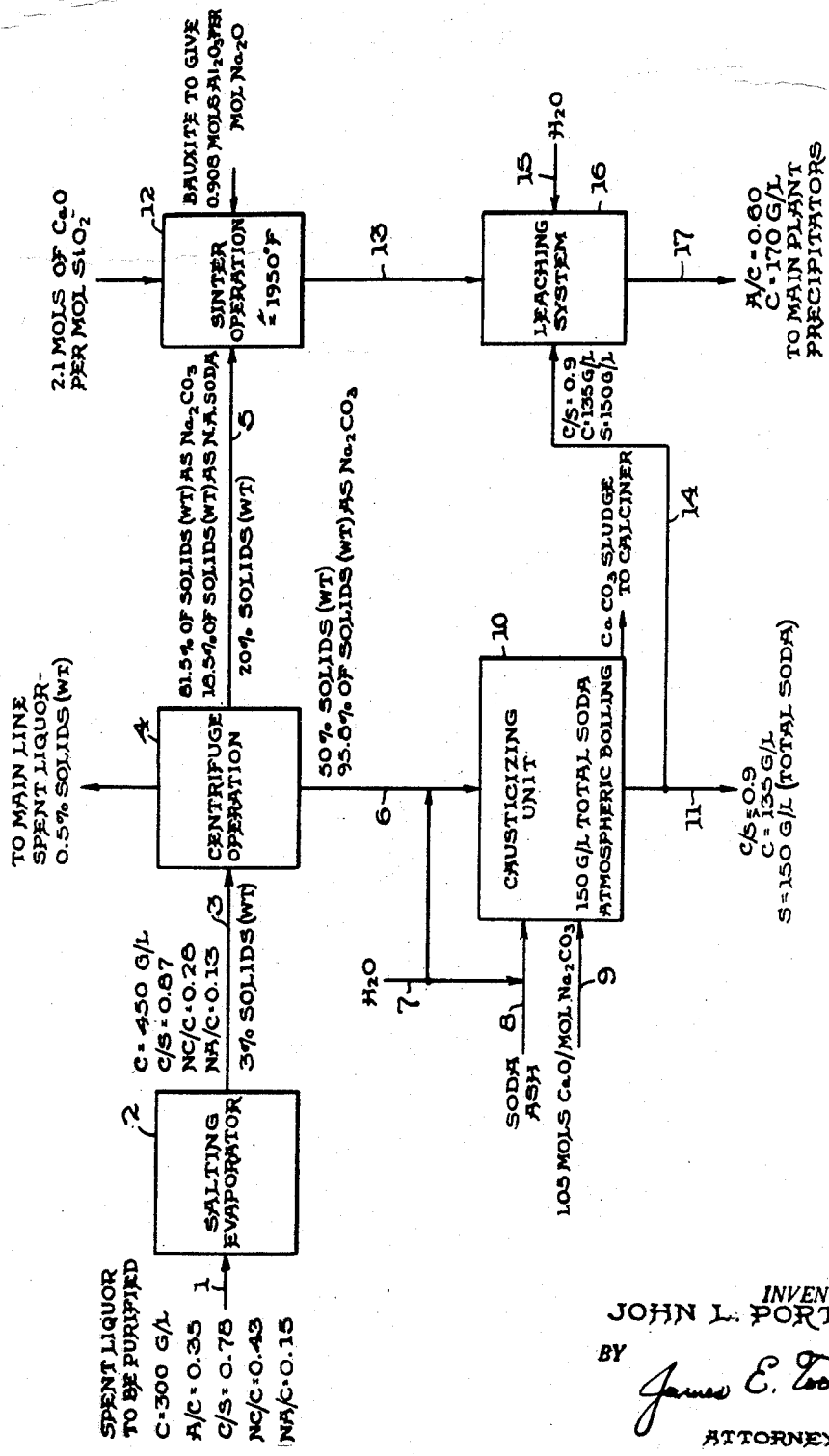

April 25, 1961 J. L. PORTER 2,981,600
PROCESS OF PURIFYING CAUSTIC ALUMINATE LIQUORS
Filed Dec. 1, 1952 4 Sheets-Sheet 2

INVENTOR.
JOHN L. PORTER
BY James E. Toomey
ATTORNEY

2,981,600

PROCESS OF PURIFYING CAUSTIC ALUMINATE LIQUORS

John L. Porter, Baton Rouge, La., assignor to Kaiser Aluminum & Chemical Corporation, Oakland, Calif., a corporation of Delaware Filed Dec. 1, 1952, Ser. No. 323,414

2 Claims. (Cl. 23—143)

The present invention relates to a process for the treatment of caustic aluminate liquors such as are used in the production of alumina from aluminous ores by the well-known Bayer process. More particularly, the invention relates to a process for the purification of contaminated Bayer process liquors to establish and/or maintain improved conditions for clarification of the liquor containing the residue of the digested ore and for the precipitation of the alumina from the clarified liquor. Specifically, the invention is directed to a process which accomplishes the removal and degradation of organic substances in the liquors, which act as settling inhibitors during clarification and which also adversely affect precipitation of alumina from the clarified liquor. The process further provides a means for control of process carbonation by rectification of non-caustic soda into caustic soda for reuse in the Bayer process. This application is a continuation in part of my copending application, Serial Number 262,808, filed December 21, 1951, and now abandoned.

The well-known Bayer process is universally operated on a continuous basis and involves pressure digestion of aluminous ores, such as bauxites and laterites, in caustic aluminate liquor of varying caustic soda concentration and at elevated temperatures depending upon the type of ore to extract the available alumina. The caustic liquor enriched in sodium aluminate is then subjected to clarification by settling, washing, and filtering to remove the so-called red mud residue of the ore which consists primarily of hydrated ferric oxide and a desilication product. Alumina is then auto-precipitated from the clarified green liquor by decomposition of sodium aluminate through seeding with previously precipitated alumina and the spent caustic liquor is recycled to the digestion phase, usually after reconcentration and addition of required amounts of make-up caustic liquor.

STATEMENT OF PROBLEM

It is recognized that the circulating caustic aluminate liquor of the Bayer process is much more complex than a mere solution of sodium aluminate and excess caustic soda. The liquor also contains relatively large quantities of dissolved sodium carbonate and smaller quantities of a complex mixture of solubilized or dissolved sodium organic substances, such as sodium organic compounds including salts, which are formed in the caustic liquor from the organic matter, such as humus, present in the ore, and from the starch which is generally employed as a flocculating agent in settling the red mud residue of the ore by the usual countercurrent decantation operation. This organic matter combined with a portion of the soda ($Na_2O$) imparts the typical dark color to the recycled liquor.

Thus, the circulating liquor is progressively contaminated with these organic substances or sodium organic compounds (designated collectively as sodium organates) and also sodium carbonate, the latter representing the so-called process carbonation of the liquor, a term used generally throughout the industry. Process carbonation involves the accumulation of sodium carbonate in the liquor through (1) the progressive degradation of sodium organic compounds of more or less higher molecular weight into this more or less ultimate form, (2) pick up of carbon dioxide in the atmosphere by the caustic soda, and (3) introduction of soda ash as such into the process liquor from the lime-soda causticizing reaction when conducted outside or inside the main liquor system.

This contaminating fraction of the total sodium or soda ($Na_2O$) content of the liquor is denominated herein as the "non-caustic soda," since it is not present as free caustic soda and is not available to form sodium aluminate. The fraction of the non-caustic soda which includes the organic substances or sodium organates is designated herein as "non-alkaline soda," since it comprises sodium compounds which are not acid titratable. The balance of the non-caustic soda is sodium carbonate. Thus, non-caustic soda=non-alkaline soda (sodium organates)+$Na_2CO_3$.

The process carbonation in the liquor must be controlled to prevent excess accumulation of sodium carbonate which serves no useful purpose and represents an inventory of causticizable soda which must be utilized. Moreover, it is recognized that sodium carbonate interferes with auto-precipitation of alumina from the clarified liquor, probably through some effect on the decomposition reaction or solubility of alumina. In addition, sodium carbonate reduces to some extent the settling rate of the red mud in the clarification phase of the process.

The non-alkaline soda (sodium organates) constitutes a minor fraction of the non-caustic soda in the contaminated process liquor. Nevertheless, it gives rise to a most serious problem in that at least a portion thereof exerts a powerful inhibiting action on the settling of the red mud or ore residue during clarification of the liquor. In addition, it has previously been recognized that organic matter in the liquor inhibits auto-precipitation of alumina from sodium aluminate liquors. This adverse effect on the settling rate of the red mud in the increasingly contaminated liquor is reflected in actual practice by an increased starch consumption based on the amount or weight of red mud which can be settled at any given rate. However, increasing starch feed rate aggravates the problem by increasing the net concentration of organic matter as sodium organates (non-alkaline soda) in the liquor, since the starch degradation products, as well as sodium organic compounds from the organic matter in the ore, include potent settling inhibitors. This cumulative effect is also reflected by further inhibition of the auto-precipitation rate.

A substantial control of process carbonation in the Bayer process is afforded by so-called inside causticizing wherein the lime-soda reaction to produce the required caustic soda is conducted in the main process liquor stream in the digesters. A certain quantity of the lime charged is used to causticize a substantial portion of the sodium carbonate formed by process carbonation. Thus, a desired low level of sodium carbonate is maintained in the recycled liquor. Inside causticizing, however, cannot function to substantially reduce the non-alkaline soda concentration, since it removes only small amounts of the sodium organates, perhaps as insoluble calcium compounds. Accordingly, the level of non-alkaline soda, i.e., sodium organate, contamination is substantially uncontrolled. This factor left uncontrolled may not seriously interfere with the Bayer process as practiced on a high grade trihydrate alumina ore, although a definite benefit in starch efficiency and precipitation rate would be realized should some control means be made available, Of perhaps greater significance is the fact that inside causticizing is of definitely limited application. This procedure can only be efficiently utilized where the ore being extracted contains substantially all of its alumina as the relatively highly soluble trihydrate whereby the caustic soda concentration of the liquor may be maintained correspondingly low (e.g. 180 grams per liter NaOH as equivalent $Na_2CO_3$).

In the production of alumina from ores of lower grade which contain a portion of the alumina as monohydrate, and particularly from ores of the European type wherein all of the alumina is in the form of the less soluble monohydrate, the concentration of caustic soda in the liquor must be substantially higher than when extracting an all trihydrate alumina ore. As a consequence, inside causticizing cannot be practiced since the relatively high caustic soda concentration of the liquor severely reduces the efficiency or degree of completion of the lime-soda equilibrium reaction. Accordingly, some means other than lime causticizing must be adopted to control process carbonation and maintain the sodium carbonate concentration at a sufficiently low level when processing lower grade or monohydrate ores. In one of its more important aspects, the present invention is directed to a particular manner of effective control of process carbonation and recovery of the sodium carbonate as caustic soda while concurrently substantially freeing the liquor of settling inhibiting sodium organates.

Of vital importance in the necessary production of alumina from the lower grade aluminous ores is the effect of the settling inhibitor portion of the non-alkaline soda (sodium organates). Most of the lower grade ores, such as the West Indian bauxites and laterites, contain large fractions of mud residue (hydrated ferric oxide) of a highly dispersible, slow or substantially non-settling nature. Moreover, these lower grade ores contain higher amounts of organic matter, such as humates and the like, than the high grade trihydrate ores. Thus, the non-alkaline soda concentration of the circulating process liquor builds up to a higher level. This combination of factors actually leads to the result that no practical settling rate for the red mud can be obtained without utilization of excessive quantities of starch. As indicated above, excessive starch consumption increases the concentration of non-alkaline soda, including settling inhibiting sodium organates, in the recycled liquor through degradation of the starch and the net effect after repeated recycling of the liquor is negative on the red mud settling rate and a further inhibition of the auto-precipitation reaction. Accordingly, efficient processing of lower grade aluminous ores by the Bayer process without control of the deleterious sodium organates (non-alkaline soda) is not attainable.

The invention is accordingly directed in its most important aspect to offsetting these adverse effects of the organic substances in the non-alkaline soda while concurrently providing a control of process carbonation and recovery of the soda ($Na_2O$) as caustic soda.

OBJECTS

It is, therefore, a primary object and purpose of the invention to provide a process for the treatment of contaminated caustic aluminate liquors whereby the deleterious effect of the non-alkaline soda fraction (sodium organates) is offset, control of process carbonation is effected, and the non-caustic soda of the liquor is rectified to caustic soda.

A further object is to provide a purification process for establishing and/or maintaining improved conditions for clarification of Bayer process liquors containing the residue of the digested ore and for precipitation of alumina from such clarified liquors.

A more specific object of the invention is to provide a treatment for alkali aluminate liquors whereby the Bayer process is rendered amenable to production of alumina from lower grade aluminous ores containing relatively large amounts of highly dispersible residues.

A specific object of the invention is to provide a process for removal and separation of a substantial portion of the sodium carbonate in the circulating caustic aluminate liquor, and for removal and separation, and degradation, of the non-alkaline soda of the liquor which inhibits settling and autoprecipitation, and rectification of the removed and separated non-caustic soda to caustic soda for reintroduction into the main process liquor.

A further specific object of the invention is to provide a process for purifying contaminated caustic aluminate liquors to improve settling rates of the red mud residue, to reduce starch consumption in the clarification phase, to improve the rate of precipitation of alumina, and to reduce losses of soda in the mud washing and alumina precipitation phases of the wet alkali aluminate process.

A further object and feature of the invention is to provide for selective separation of the removed sodium carbonate and the removed non-alkaline soda (sodium organate) to advantageously permit direct causticizing of the former with minimum loss of alumina, and to permit more economical recovery of both soda and alumina from the latter.

These and other objects and advantages of the invention will become apparent from the following detailed description thereof.

LIQUOR PURIFICATION

The invention in its most generic aspect embraces the treatment of caustic aluminate liquors containing sodium organic compounds (sodium organates) comprising concentrating the liquor to obtain a precipitated sludge of sodium organates and separating the resulting sludge from the liquor. The sludge is a gelatinous slimy precipitate, the identity of which is unmistakable so that it suffices to state that the liquor should be concentrated sufficiently to obtain this type of precipitate.

The separation of this sludge from the concentrated liquor is critical to substantially complete realization of the objective of removal of the organic settling inhibitor compounds which may be contained therein, and consequent increase in the red mud settling rate and starch effectiveness. It has been found according to the invention that in actual large scale practice centrifuging is the best means of clarifying the concentrated liquor and separating the sludge in the form of a relatively high solids slurry. However, other methods of separation may be employed, such as filtration, which is suitable in treating small quantities of liquor but not recommended for large liquor volumes due to the slow filtering nature of the sludge.

In referring to liquor purification by the present invention it is to be understood that the step of concentrating the liquor accomplishes a decontamination beyond a reduction in settling inhibitor content by precipitation and removal of a substantial portion of the non-alkaline soda from the liquor. The heating of the liquor to evaporate water and the resulting increase in caustic soda concentration apparently both contribute to a degradation of the organic substances acting as settling inhibitors whereby relatively innocuous decomposition products are evidently formed, some of which are insoluble in the concentrated liquor and constitute a portion of the sludge, while others comprise a part of the soluble non-alkaline soda retained in the liquor. It is not intended, however, to limit the process to any particular mechanism or theory of action, and it suffices to state that the concentration of the contaminated liquor with subsequent clarification to separate the precipitated sludge effectively frees the liquor substantially completely of the sodium organic compounds of the non-alkaline soda fraction which act as settling and precipitation inhibitors as evidenced by improved red mud settling rates, starch effectiveness and alumina precipitation.

The concentration of the liquor to obtain the non-alkaline soda precipitate also results in a salting out or crystallization of a substantial portion of the sodium carbonate fraction of the non-caustic soda in the circulating liquor treated, since the solubility of the carbonate decreases with increasing caustic concentration. Thus, the purification of the liquor also provides a direct means of controlling process carbonation thereby reducing the carbonate soda concentration in the circulating liquor and maintaining a desirably high ratio of caustic soda to total soda (C/S=ratio of caustic soda, C, as free NaOH and as combined in the form of sodium aluminate, and total soda, S, as caustic soda plus carbonate soda) in the process liquor.

Accordingly, the present invention advantageously provides for improvement in the quality or purity of the process liquor. Improved quality or purity of the liquor, as used herein, is intended to mean that the liquor after treatment contains less non-caustic soda, particularly the sodium carbonate fraction; less non-alkaline soda; and reduced concentration up to the point of substantial freedom of sodium organic compounds which are settling inhibitors and which adversely affect the effectiveness of starch in settling the red mud residue of the ore. The liquor purification process, as above described, is beneficial to a variable degree in any case of alumina production by the wet alkali aluminate method depending upon the impurity level in the liquor; but is vital and necessary to the operativeness of the Bayer method applied to certain types of bauxites and laterites, such as West Indian ores, if the red mud residues are to be settled from the process liquor in a practical and successful manner. Thus, the invention provides a means for establishing and maintaining a Bayer liquor of such purity that red mud residues from these types of ores may be settled by the use of a practical and necessarily limited amount of starch, which ore residues could not otherwise be processed at all.

In the application of the process in actual commercial practice the size or capacity of the purification operation is based on that required to rectify the non-caustic soda formed and/or introduced in the circulating process liquor per cycle and the existing level of such impurities in the liquor, if any. The amount of non-caustic soda (sodium carbonate and sodium organates) existing and formed may be determined by appropriate liquor analysis and for any given liquor depends on many factors including (1) the nature of the bauxite particularly the organic matter content, (2) the contribution of the starch in formation of sodium organates, (3) the sodium carbonate introduced with the causticizer effluent, and (4) other net process carbonation including carbonate soda formed from the organic matter of the ore and starch. Accordingly the fraction of the process liquor to be treated per cycle is widely variable since it depends on the level of non-caustic impurities and the amount of formation thereof per cycle, including both settling inhibiting organic compounds and sodium carbonate.

Moreover, the fraction cut out to purification must also be determined with reference to the amount of non-caustic soda precipitated as sludge, which in turn is dependent on the level or concentration of the non-caustic impurities in the liquor being treated, the degree to which the caustic liquor is concentrated, and the degree of separation of the sludge or clarification of the treated liquor.

Finally, the requisite degree of purification of the circulating liquor varies depending upon relative difficulty of settling the red mud residues of different aluminous ores, that is, for a given starch consumption certain residues will settle at practical and adequate rates at permissibly higher levels of liquor impurities.

Therefore, the specific and optimum operating conditions must necessarily be determined empirically for each particular case and such determination may readily be accomplished from liquor analyses, and observation of the degree of improvement in ore residue settling rates at a desirably low starch feed rate (amount of starch based on the weight of mud treated).

It may be stated, however, that in general the concentration of the liquor should proceed to at least 350 grams per liter caustic soda (as equivalent $Na_2CO_3$) when confronted with non-caustic soda in what may be termed normal amounts, although as indicated above, the particular caustic soda concentration at which the gelatinous precipitate is obtained varies necessarily with the level or concentration of the non-alkaline soda impurities in the liquor (and to some extent with the varying specific composition of these impurities which is relatively unknown and indeterminable). The amounts of both the slimy gelatinous precipitate of the complex mixture of sodium organic compounds and the sodium carbonate precipitate may be increased by increasing the caustic soda concentration up to about 600 grams per liter. However, the density of the viscous caustic liquor is increased at such high concentrations and tends to increase the difficulty in separation of the sludge therefrom. This is important in determining optimum concentration since maximum clarification of the treated liquor is an essential objective in practicing the purification process. In regard to specific conditions of the liquors investigated, it was found that caustic soda concentrations of from about 380 to about 500 grams per liter were most advantageous.

The sludge precipitated by the concentration is then effectively separated from the caustic liquor as a slurry containing as high as about 50 to 60% solids content with the clarified liquor containing only about 0.5% solids when utilizing the preferred centrifuging operation as the means of separation.

ALTERNATIVE PROCEDURES

In the operation of the process of the invention, it has been found that in general an increase in liquor purity is obtained with the following process variations:

(1) Conducting the liquor concentration by a batch type operation which is slower than the continuous type of salting evaporation generally contemplated in the foregoing description.

(2) Holding the concentrated liquor, either at concentration temperature or allowing cooling, for a period sufficient to approach equilibrium conditions between the compounds in the precipitated sludge and their dissolved counterparts. This constitutes a means of obtaining the advantageous result of the conditions under (1) above while operating on at least a semi-continuous basis.

(3) The liquor may be subjected to higher temperatures during concentration by operating the evaporator under pressure or with reverse feed to obtain temperatures above atmospheric boiling points of the liquor (for example in concentrating to 450 grams/liter, backward feed increased the temperature from about 250° F. to about 300° F.); or (4) Additions of very small but effective amounts of lime in any suitable form to the concentrated liquor containing the sludge prior to clarification either with or without a significant holding period before separation of the sludge.

The advantages of the invention are fully indicated with reference to the results described in detail below in connection with the tabulated data and the graphs and flow sheets of the drawings. Certain terms or symbols referring primarily to liquor composition are employed below and in the drawings and accordingly are hereby defined as follows:

The liquor composition in terms of alumina, caustic soda, total soda and total sodium content may be determined by analysis. Thus TNa=Total sodium in the liquor as determined by uranyl acetate method.

C = Caustic soda, that is, free NaOH plus NaOH combined as sodium aluminate as determined by titration to sodium hydroxide end point.
S = Total soda, that is, caustic soda plus soda as $Na_2CO_3$ (total acid titratable soda) as determined by titration to total alkalinity end point.
A = Alumina as determined by precipitation as $$Al_2O_3 \cdot 3H_2O$$

by neutralization and subsequent calcination.

The (1) non-caustic soda, (2) non-alkaline soda, and (3) sodium carbonate contents of the liquor are then determined by difference. Thus N.C.(non-caust. soda) = TNa—C = non-caustic soda
N.A. (non-alk. soda) = TNa—S = non-alkaline soda (sodium organates)
$Na_2CO_3$ (carb. soda) = S—C = sodium carbonate (also N.C.—N.A.)

In the specification and appended claims the concentrations are indicated in grams per liter. Caustic soda (NaOH) is in all cases expressed as equivalent $Na_2CO_3$, and the ratios of these values are accordingly weight ratios.

The effect of the concentration of the liquor in removing non-caustic soda is clearly established from the data given in Table I below, wherein samples of contaminated liquor from a continuously operated Bayer process plant were subjected to concentration at atmospheric boiling temperatures by (1) batch evaporation and (2) continuous evaporation on a commercial scale, and thereafter the hot sludge-containing liquor was immediately pressure filtered as is:

Table I

(1) BATCH EVAPORATION

| C [1] | 169.7 | 328.6 | 407.8 | 425.5 | 472.1 | 542.6 | 619.2 |
|---|---|---|---|---|---|---|---|
| TNa [1] | 275.9 | 485.5 | 528.0 | 544.2 | 579.7 | 652.0 | 739 |
| N.C./C | .626 | .477 | .295 | .279 | .228 | .201 | .193 |

(2) CONTINUOUS EVAPORATION

| Sample | 0 [a] | 1A | 2A | 3A | 4A |
|---|---|---|---|---|---|
| C [1] | 249.5 | 400.1 | 450.3 | 492.1 | 516.5 |
| TNa [1] | 369.5 | 544.6 | 581.2 | 629.9 | 655.2 |
| N.C./C | .481 | .362 | [2] .291 | .280 | .268 |
| N.A./C | .190 | .171 | [2] .145 | | |

[1] Grams per liter.
[2] N.C./C and N.A./C of untreated liquor was .514 and .157, respectively.
[a] Untreated liquor.

A comparison of the non-caustic soda to caustic soda ratios (NC/C) indicates that batch evaporation accomplishes a greater reduction for a given caustic soda concentration, or conversely, continuous evaporation requires a higher degree of concentration to obtain the same NC/C in the liquor. In either case, however, a substantial portion of the non-caustic soda is removed from the liquor in the form of a precipitated sludge.

In addition, runs 1A and 2A indicate a significant reduction in non-alkaline soda to caustic soda ratio, i.e. from .190 to .170, and .157 to .145 or about 11% and 8%, respectively. The relatively small change in NA/C ratio cannot be taken as a criterion of the efficiency of the process in removing sodium organic compounds which constitute potent settling inhibitors. The heating on concentrating and the strong caustic liquor resulting apparently cause an increase in the combined non-alkaline soda present in the treated liquor. This may be due to decomposition of higher molecular weight sodium organates into lower molecular weight organic compounds containing salt-forming groups such as, —COOH, thus increasing the quantity of total sodium present as non-alkaline soda by neutralizing more caustic soda.

In any event, the improvement in settling rate on a red mud residue, which is particularly difficult to settle, accurately reflects the most important advantage of the invention. The contaminated continuous Bayer plant liquor utilized in obtaining the results set forth below in Table II was the liquor sample indicated as 0 in Table I above, subjected to the treatment above-described. The untreated and treated liquors had the following analyses:

| Sample | 0 | 1A | 2A | 3A | 4A |
|---|---|---|---|---|---|
| | Grams/liter | | | | |
| $Al_2O_3$ | 82.5 | 133.8 | 150.6 | 166.1 | 173.5 |
| C | 249.5 | 400.1 | 450.4 | 492.1 | 516.5 |
| S | 322.1 | 476.3 | 516.1 | 553.5 | 575.5 |
| TNa | 369.6 | 544.6 | 581.2 | 629.9 | 655.2 |
| $Na_2CO_3$ | 72.7 | 76.2 | 65.7 | 61.5 | 59.0 |
| NC | 120.1 | 144.5 | 130.8 | 137.9 | 138.7 |
| NA | 47.4 | 68.3 | 65.1 | 76.4 | 79.7 |
| | Wt. ratios | | | | |
| A/C | 0.331 | 0.334 | 0.334 | 0.338 | 0.336 |
| C/S | 0.774 | 0.840 | 0.873 | 0.889 | 0.898 |
| N.C./C | 0.481 | 0.362 | 0.291 | 0.280 | 0.268 |
| N.A./C | 0.190 | 0.171 | 0.145 | 0.155 | 0.154 |

SETTLING TESTS

The untreated liquor 0 and the clarified treated liquors 1A, 2A, 3A and 4A were then employed in tests to determine settling rates. The tests involved an actual single digest of bauxite in each liquor in order to reproduce as nearly as possible the red mud settling conditions encountered in actual plant practice in Bayer liquor clarification, and subsequent settling tests on the red mud residues.

*Digestion.*—An amount of untreated liquor (0) to give the equivalent of 175 grams of caustic soda (as equivalent $Na_2CO_3$) was placed in a stainless steel batch digester. 82 grams of Jamaican bauxite having a particularly large red mud residue content of highly dispersible nature was then added. From the liquor analysis and the known amount of available alumina in the bauxite, an additional amount of alumina hydrate was calculated and added to produce a charging ratio of alumina to caustic (A/C) of 0.55 in the digester effluent. Water was then added to bring the caustic soda concentration to 220 grams per liter.

The digester was purged of air by sweeping with nitrogen and the ore charge was digested for 30 minutes at 200° C., the heat being supplied by a high pressure steam jacket. The digested slurry was cooled to 165° C. by passing water through the jacket and the slurry was then flashed from 165° C. to atmospheric pressure.

*Settling rate.*—The hot slurry was drained into a stainless steel beaker and the volume adjusted to 975 ml. to give a caustic soda (C) concentration of 180 g./l. The slurry was maintained at its atmospheric boiling point and presolubilized starch in amount of 0.385% based on the weight of red mud was added and the slurry was stirred for two minutes. The starch solution was prepared as follows:

5 grams of Maine potato starch was heated to 100° C. for 25 minutes in 200 ml. of a 2.5% (by weight) NaOH solution. The solution was cooled and adjusted to a starch concentration of 20 g./l. 5 ml. of the starch solution was added to the digested slurry. Of the 82 grams of bauxite charged, about 26 grams remains as mud residue. The 5 ml. of starch at 20 g./l. is equivalent to 0.385% of the 26 grams of red mud.

The starch containing slurry was placed in a 1000 ml. graduate provided with a picket type rake, the rake extending upward from the bottom to about one-half the depth of the graduate, and maintained in motion from a centrally disposed rake shaft (to simulate the rakes of the Bayer plant clarifiers).

The slurry was settled with the rake revolving at one r.p.m. By observation of the time for the mud to settle between given points on the graduate, the settling rate in feet/hour was calculated in known manner. The rate observed is the rate during constant settling. The same digestion and settling rate procedure was used for each sample of purified liquor.

The results are indicated below:

Table II
SETTLING RATES—AS IS [1]

| Sample | 0 | 1A | 2A | 3A | 4A |
|---|---|---|---|---|---|
| NC/C | .481 | .362 | .291 | .280 | .268 |
| R, ft./hr.[2] | 1.3 | 5.2 | 4.7 | 5.5 | 4.1 |

[1] Without adjustment of C/S to constant value.
[2] Settling rate calculated from observed rate.

The red mud settling rates obtained on the purified liquors in all cases were between three and four times faster than that on the untreated liquor.

For purified liquor samples wherein the sludge was centrifuged off instead of pressure filtered, the "as is" settling rates were:

Table III

| Sample | 0 | 1B | 2B | 3B | 4B |
|---|---|---|---|---|---|
| R, ft./hr.[2] | 1.3 | 4.4 | 3.7 | 5.1 | 4.6 |

[2] Settling rate calculated from observed rate.

The additional improvement obtained in settling rate by treatment of the concentrated liquor with very small but effective amounts of lime is indicated as follows:

Concentrated liquor samples corresponding in analysis to 2A, 3A and 4A were treated with 0.75% CaO on the weight of slurry for twenty minutes and pressure filtered hot, and the purified liquor samples were then tested for settling rates with the following results which may be compared with 2A, 3A and 4A in Table II above.

Table IV
LIME TREATED SAMPLES—FILTERED AND SETTLED AS IS

| Sample | 2D | 3D | 4D |
|---|---|---|---|
| R, ft./hr | 7.4 | 7.0 | 7.2 |

These improved settling rates were accompanied by a significant reduction in the non-alkaline soda to caustic soda ratio compared to the purified unlimed liquors, for example, 2A and 4A, in Table V below. On the other hand, the carbonate soda ($Na_2CO_3$) to caustic soda ratios did not show any appreciable change as follows:

Table V

| | Unlimed and Filtered | | Limed and Filtered | |
|---|---|---|---|---|
| Sample | 2A | 4A | 2D | 4D |
| NA/C | 0.145 | 0.154 | 0.120 | 0.117 |
| $Na_2CO_3$/C | 0.146 | 0.114 | 0.142 | 0.111 |

This action of lime in increasing liquor purity without decrease in the $Na_2CO_3$/C ratio is not completely understood, but may be due to a flocculating effect on the gelatinous sludge or a catalyzing effect on degradation of the settling inhibiting organic compounds into insoluble compounds, while the caustic soda concentration of the liquor is too high to permit any significant lime-$Na_2CO_3$ reaction.

The additional improvement in settling rates obtained under conditions allowing the liquor to more nearly approach equilibrium conditions as opposed to a straight through continuous concentration and immediate separation of sludge from the hot concentrated liquor is shown by the comparative data of Table VI below.

Table VI

| | Pressure Filtered Hot Immediately As Is | | Pressure Filtered After Holding for 24 Hours at 180° F. | |
|---|---|---|---|---|
| Sample | 3A | 4A | 3C | 4C |
| R, ft./hr | 5.5 | 4.1 | 9.0 | 9.6 |

Thus, an important feature of the invention is the use of small but effective amounts of lime up to about 1% on the weight of the slurry (filter or centrifuge feed) to increase liquor purity. This alternative is particularly advantageous where operating on a continuous plant scale and the advantageous holding periods at temperature (or with cooling and reheating) as shown in Table VI are less practical.

The fundamental contribution of the invention may be expressed in terms of increased efficiency of starch in red mud settling (as well as by increased settling rates at fixed amounts of starch as shown in Table II, above).

Figure 4:
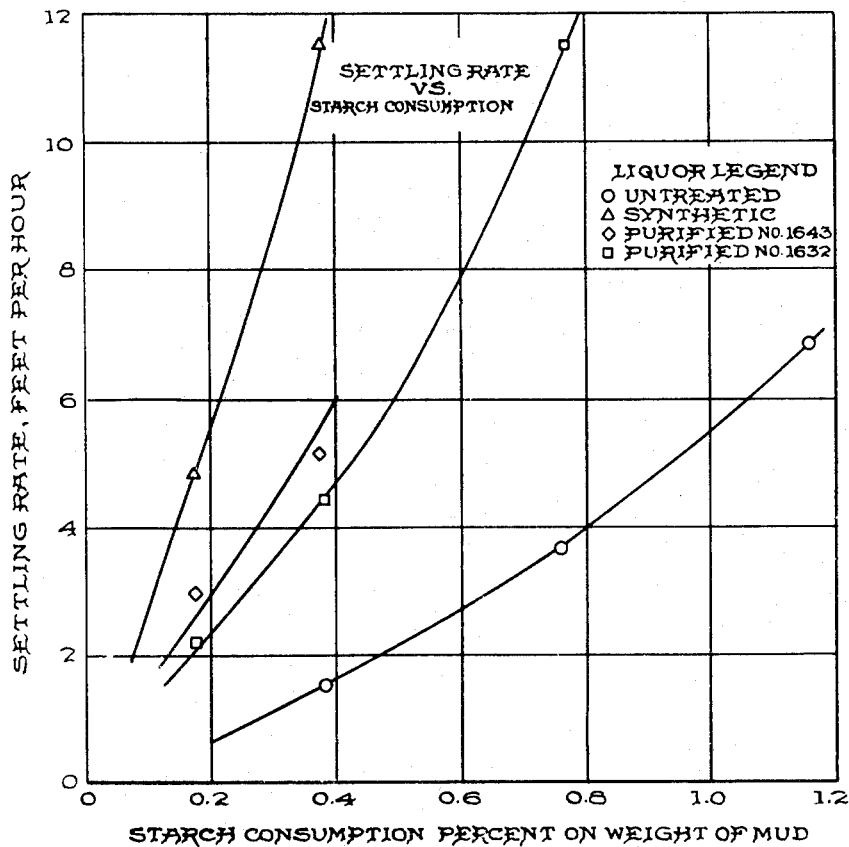

The constant (free) settling rates of untreated contaminated liquor, a synthetic liquor, and purified liquor were determined using the exact test conditions set forth above under "Settling Tests." The results are shown in Table VII and in the graph of Figure 4 of the drawings.

Table VII
LIQUOR SAMPLE [1]—MUD SETTLING RATE, FT./HR.

| Starch [2] Consumption | A Synthetic | B Purified No. 1632 | C Purified No. 1643 | D Untreated |
|---|---|---|---|---|
| 0.193 | 4.9 | 2.3 | 3.0 | (a) |
| 0.385 | 11.5 | 4.4 | 5.2 | 1.5 |
| 0.77 | | 11.5 | | 3.8 |
| 1.16 | | | | 6.9 |

(a) Too slow to measure.
[1] Liquor Descriptions: A—Synthetic A caustic aluminate liquor made up with alumina hydrate, NaOH solution and $Na_2CO_3$ to give a synthetic spent liquor of approximately the same composition as untreated contaminated liquor D, except it contained no non-alkaline soda, i.e., all non-caustic soda was $Na_2CO_3$, and the C/S ratio was 0.80 for settling tests; D—Untreated Bayer plant liquor composite sample of feed to the salting evaporator of an average C/S ratio of 0.752, and of which one part had the composition of liquor 0 in Table I; B—No. 1632. Composite sample of centrifuge overflow from a plant scale operation with the addition of 0.75% slaked lime to the evaporator effluent. C=444 grams per liter and C/S=.872; C—No. 1643. Composite sample of centrifuge overflow from a plant scale operation with the addition of 0.75% slaked lime to the evaporator effluent. C=484 grams per liter, C/S=.864.
[2] Percent by weight on red mud of presolubilized Maine potato starch added after digestion.

The results shown in Table VII above are graphically illustrated in Figure 4. These data clearly illustrate the remarkable reduction in starch consumption accomplished by the purified liquor of the invention. For example, to obtain a settling rate of 5 feet per hour, the purified liquor 1643 requires less than 0.385% starch, the liquor 1632 only slightly over 0.4% while the untreated liquor requires over 0.9% starch.

The foregoing results are influenced by the variations between C/S ratios in the respective liquors. However, even though the results reported combine the effect of the removal of sodium carbonate with the effect of removal and degradation of settling inhibitors of the non-alkaline soda, it is correctly representative of conditions established in a plant liquor by the purification process, since it is one of the accomplishments of the invention to control process carbonation (reduce the concentration of $Na_2CO_3$ in the liquor). Moreover, it must be noted that the C/S ratios attained in purifying the liquor, except liquor A, where reduced to 0.80 before conducting the settling tests in order to more closely approximate sodium carbonate concentrations which would normally be maintained in a blend of untreated and purified liquor in commercial plant scale practice.

INCREASE IN PRECIPITATION RATE

The increase in purity of circulating liquor also leads to a significant increase in precipitation rate of alumina from the green or pregnant liquors. It is recognized that accumulation of organic matter, in particular, sodium organic compounds, in Bayer process liquor upon repeated recycling causes a rise in "finishing ratio" for a given length of time and a drop in alumina production per unit of caustic liquor circulated. The amount of alumina remaining in solution at the end of the precipitation cycle, as a measure of yield, is commonly expressed as the so-called "finishing ratio" or A/C ratio of the spent liquor. A rise in finishing ratio represents a drop in alumina production.

Table IX below shows the significant increase in yield of alumina obtained with a purified liquor and a blend of purified and untreated liquor, as compared with an untreated contaminated Bayer plant liquor. The purified liquor was prepared by concentrating a sample of untreated liquor to about 500 grams per liter caustic soda (expressed as equivalent $Na_2CO_3$). The blend consists of a mixture of 50% purified and 50% untreated liquor. The liquors were digested with calculated amounts of alumina hydrate to give the indicated A/C ratios. Fine seed of tray thickener quality was employed in a weight ratio of seed to soluble alumina of 1 to 2. During the first 24 hours of the precipitation cycle the liquors were held at 150° F., the temperature being lowered to 140° F. thereafter. The basic spent liquors analyzed as follows (concentrations in grams per liter):

| Liquor | A | C | S | TNa | C/S | C/TNa |
|---|---|---|---|---|---|---|
| Purified | 64.2 | 225 | 253 | 287 | .889 | .785 |
| Blended | 63.8 | 224 | 290 | 320 | .772 | .700 |
| Untreated | 63.3 | 223 | 322 | 357 | .692 | .624 |

The results are shown as follows:

Table IX

| Precipitation Time (hrs.) | Purified | | Blend | | Untreated | |
|---|---|---|---|---|---|---|
| | A/C | Percent Yield | A/C | Percent Yield | A/C | Percent Yield |
| 0 | .624 | | .620 | | .632 | |
| 8.5 | .409 | 34.3 | .410 | 33.7 | .421 | 33.2 |
| 17 | .375 | 39.6 | .376 | 39.2 | [1] .388 | 38.6 |
| 24 | .357 | 42.9 | .362 | 41.4 | .373 | 40.9 |
| 44 | .328 | 47.5 | .340 | 45.1 | .344 | 45.7 |

[1] 17½ hrs.

Figure 3:
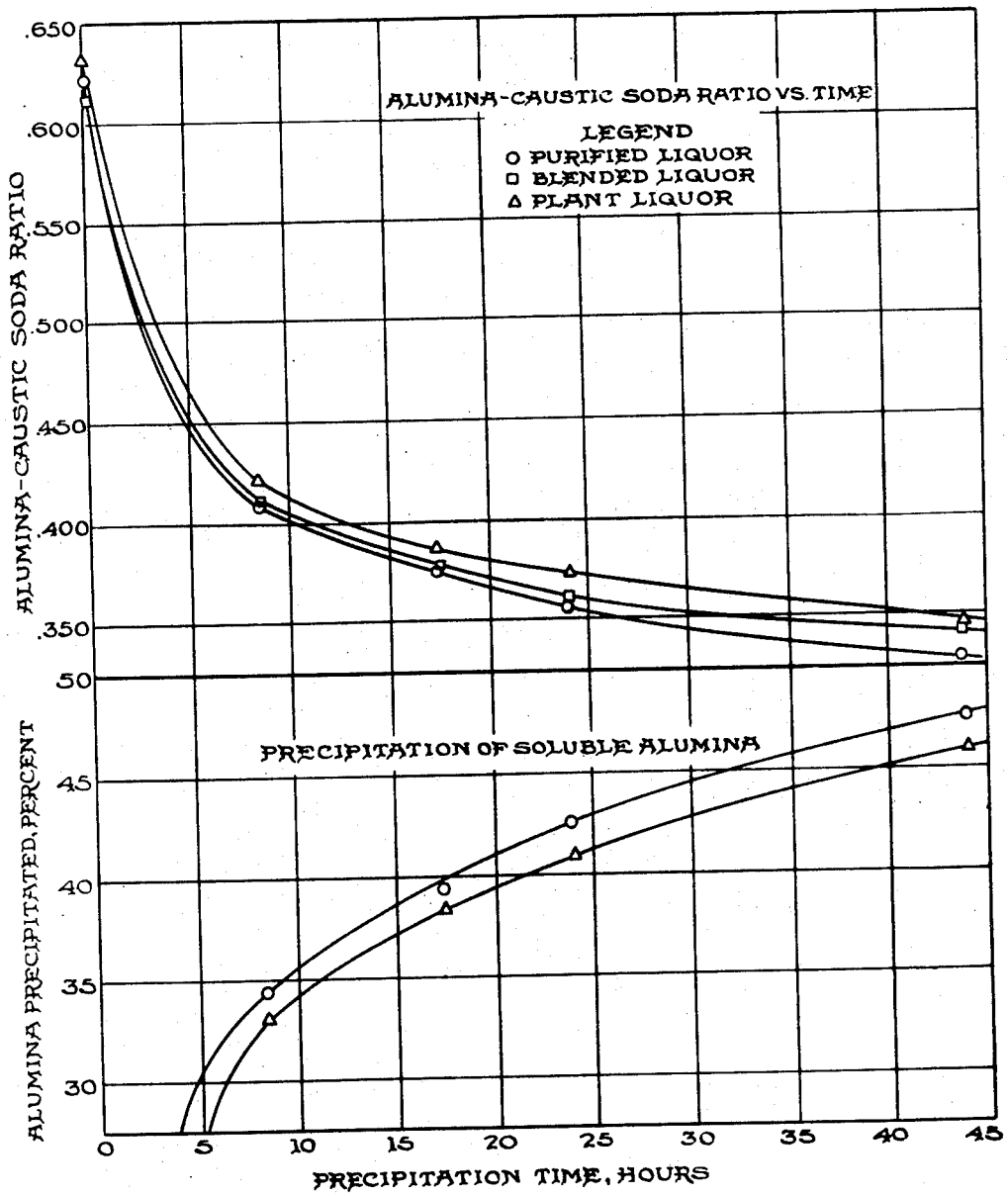

These results are graphically illustrated in Figure 3.

SINTER AND CAUSTICIZING OPERATIONS

The invention, as a further feature, provides for recovery and return of substantially all of the soda and alumina removed from the cyclic Bayer system during liquor purification.

The sludge precipitated by concentration and separated by centrifuging (or filtering) into a high solids slurry is advantageously mixed with an alumina-containing material and the mixture subjected to a sintering operation at appropriate temperatures, for example, 1000 to 1200° C., preferably 1050–1150 (or about 1900 to 2100° F.) to destroy the organic matter, thus decomposing the sodium organates and also the sodium carbonate to form sodium aluminate with the alumina in the alumina-containing material and some excess soda. Lime in proper amount is added (usually in the form of $CaCO_3$) to minimize reaction of soda and alumina with the silica in the alumina-containing material and subsequent loss in silicate form. The sintered product is leached with diluted caustic soda solution (e.g. diluted causticizer effluent, spent liquor, or hydrate wash liquor) and the leach liquor obtained corresponds to a green caustic aluminate liquor ready for precipitation. Thus, the alumina of the ore, and the alumina in the mother liquor of the sludge, is substantially all recovered as sodium aluminate, the remaining fraction of the soda being substantially recovered as caustic soda.

The alumina-containing material fed to the sinter operation may be any suitable aluminous ore, the alumina of which in a least substantial proportion forms sodium aluminate upon sintering by the well-known lime-soda method. Preferably, the material is a fresh ore with a high alumina to silica ratio for optimum efficiency in recovery of non-caustic and/or non-alkaline soda from the sludge through causticizing to sodium aluminate and caustic soda. However, lower grade bauxite ores of the high silica type, clay, or other silicious aluminous ores, and ore residues, or mixtures of any of these materials with or without high grade bauxites may be employed with recovery of the alumina and a major portion of the soda.

Such material may in particular be a red mud residue obtained from the alkali aluminate Bayer process digestion of a high silica aluminous ore. The Bayer process as applied to high silica ores results in a loss of about one pound of alumina and about one pound of soda for each pound of silica in the ore. The loss appears in the form of an insoluble desilication product (a sodium aluminum silicate) which is precipitated, and removed with the insoluble red mud. The alumina in the red mud residues of such high silica bauxites may be solubilized by the lime-soda sinter method, and a substantial part of the soda causticized by formation of sodium aluminate. The sinter is then leached with dilute caustic soda solution or spent liquor, and the caustic aluminate liquor returned to the circulating Bayer process liquor for recovery of the alumina. Thus, red mud residues of high silica ores may constitute all or a part of the alumina requirements and a part of the soda requirements of the sinter operation, while the soda-containing sludge, including both the gelatinous sodium organates and the sodium carbonate, or a fraction enriched in the non-alkaline soda content and obtained as described below, constitutes the balance of the soda requirements of the sinter operation.

The relative amounts of the soda-containing sludge and alumina-containing material will depend, of course, on the relative soda and alumina contents of these materials. In general, the proportions, including the lime added, are adjusted to produce a maximum of solubilized alumina and soda, and a minimum of soluble silica. The available soda is usually maintained in slight excess over that required to form sodium aluminate with the alumina content of the sinter feed, and lime is added in slight excess over that required to insolubilize the silica.

With fresh aluminous ores, as opposed to soda-containing ore residues, the concentrated sludge usually constitutes all of the soda requirements for the sinter operation, although in some instances it may be supplemented witht fresh soda ash. Also, as above-indicated, fresh bauxite or other aluminous ore may be employed in conjunction with or in place of the red mud residue. Accordingly the term "aluminous ore," as used in the specification and claims embraces ore residues containing alumina, as well as fresh ores, and mixtures of such materials.

As an alternative, a fractional centrifuging of the precipitated sludge may be accomplished to give (1) A high solids slurry of 50–60% solids by weight rich in sodium carbonate and relatively low in concentrated caustic mother liquor containing alumina, and low in the slimy gelatinous precipitate of sodium organates.

(2) A low solids slurry 15 to 30% by weight, relatively lean in sodium carbonate and high in non-alkaline soda sludge and mother liquor containing alumina.

The carbonate rich-low alumina and non-alkaline soda slurry is adaptable to direct causticizing to rectify the sodium carbonate to caustic soda. It contains a minimum of non-alkaline soda, which under ordinary lime causticizing conditions is not causticizable. Moreover, it is important to reduce the alumina and caustic soda content in this causticizer feed since most of the alumina would be lost as insoluble calcium aluminate which goes out with the lime sludge ($CaCO_3$) formed and the caustic soda would reduce efficiency of the lime-soda reaction. As a further means of lowering the alumina and caustic soda concentrations of the causticizer feed, it is recommended that the carbonate rich slurry be only a fraction of the total feed, using fresh soda ash solution as the balance.

The carbonate lean slurry, high in alumina containing mother liquor and high in non-alkaline soda sludge advantageously constitutes a reduced load for the sinter operation and permits reduction in capacity of equipment required.

Figure 2:
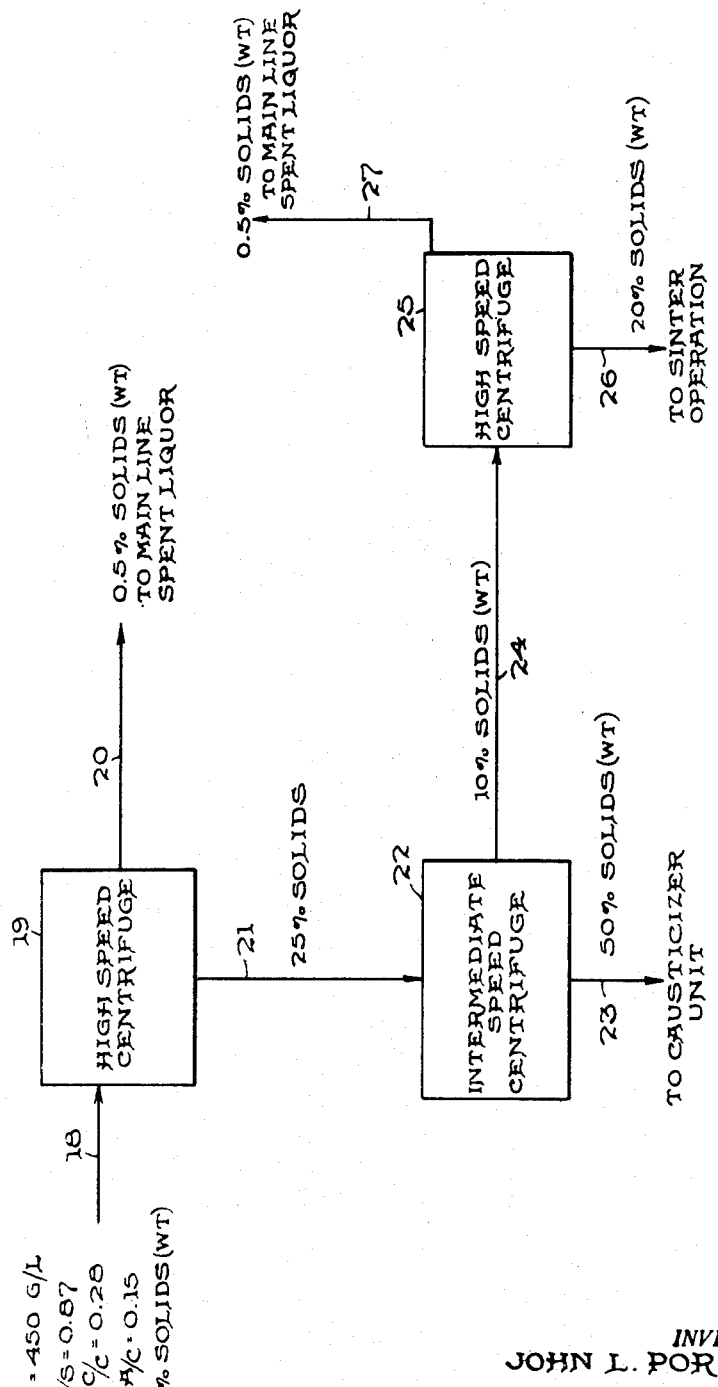

The overall process is more fully described in conjunction with the following example with reference to the accompanying drawings (Figures 1 and 2).

EXAMPLE

Referring to Figures 1 and 2, there is shown schematic flow diagrams of one preferred embodiment of the invention illustrating the purification process wherein spent liquor is concentrated and the precipitated sludge is separated from the concentrated liquor by centrifuging with subsequent treatment of sludge fractions to rectify the soda ($Na_2O$) and to recover the same as caustic soda (NaOH and sodium aluminate), while also recovering the alumina in the liquor associated with the sludge.

Referring now particularly to Figure 1, a selected fraction of contaminated spent liquor to be purified having the analysis indicated on the flow sheet is introduced through line 1 into a salting type evaporator wherein the liquor is concentrated to a caustic soda concentration of 450 g./l. to obtain a slimy gelatinous precipitate of a portion of the non-alkaline soda or sodium organates and a precipitate of sodium carbonate. The precipitated sludge of non-caustic soda compounds constitutes 3% by weight of the salting evaporator effluent and it is to be noted that the non-caustic to caustic soda ratio in the liquor dropped from 0.43 to 0.28 and the caustic to total soda ratio increased from 0.78 to 0.87 in concentrating the liquor from a caustic soda concentration of from 300 g./l. to 450 g./l. In addition, the non-alkaline soda to caustic soda ratio decreased from 0.15 to 0.13, a significant decrease of about 13%.

The effluent liquor from salting evaporator 2 is passed through line 3 to the centrifuging operation indicated at 4 where the sludge is concentrated and separated from the concentrated liquor to produce a highly clarified liquor containing only 0.5% solids by weight which is recycled to the mainline spent liquor as indicated. The thickened sludge, as shown in Figure 1 is separated by the centrifuging operation into two fractions as separate centrifuged underflows. One fraction of a high solids content, namely 50% solids by weight containing 95.8% of its solids as sodium carbonate, is subjected to direct causticizing by passing the slurry through line 6 to the causticizing unit 10. Only a very low content of non-alkaline soda is present in the sludge of this slurry and also in the liquor associated with the sludge. As a consequence, the non-caustic soda content of the slurry is substantially all in the form of the readily causticizable sodium carbonate with a minimum content of non-causticizable or difficultly causticizable non-alkaline soda compounds or sodium organates. This liquor is diluted by the addition of water as indicated at 7 to adjust the caustic soda concentration of the liquor in the causticizing unit to a low value which will permit approximately maximum efficiency of the causticizing reaction conducted therein, that is, not less than about 90% conversion of the sodium carbonate charged to the unit. The feed to the causticizing unit may be fortified by the addition of fresh soda ash as indicated at 8 in the flow sheet. The lime for causticizing is charged at 9 into the causticizing unit with 1.05 mols of lime being charged for each mol of sodium carbonate in the liquor to be causticized. The causticizing operation is conducted at a total soda concentration of 150 g./l. at the atmospheric boiling point of the liquor and produces a causticizer effluent as indicated at 11 having a caustic soda concentration of 135 g./l. and a total soda concentration of 150 g./l. indicating that the causticizing unit operates at a conversion factor of at least 90% yielding a caustic to total soda ratio in the liquor of at least 0.9. The specific caustic soda to total soda ratio in the causticizer effluent liquor will vary somewhat depending upon the relative proportions of soda ash contributed by the centrifuge underflow slurry and by the fresh soda ash. For example, with 100% soda ash feed a C/S ratio of 0.953 has been obtained with a 50% soda ash–50% centrifuge underflow feed to the causticizer a C/S ratio of 0.923 has been obtained.

The second fraction of separated precipitated sludge thickened to a 20% by weight solids content contains 81.5% of the solids as sodium carbonate with a high concentration of 18.5% of its solids as non-alkaline soda, that is, sodium organates precipitated from the liquor by concentration. This fraction is passed through line 5 to a sinter operation 12 wherein it is mixed with bauxite ore in amount to give about 0.908 mol of alumina in the mixture per mol of soda in the sludge slurry from line 5. Also, lime is added in the amount of 2.1 mols per mol of silica in the ore charged to the sinter operation in order to minimize loss of alumina from the bauxite and from the sludge as insoluble sodium aluminum silicate. The sinter charge adjusted to the proper solids content is heated to a temperature approximating 1950 degrees F. after which the sintered product is charged through line 13 to a leaching system. The sinter product is leached at 16 by the addition of causticizer effluent liquor through line 14 diluted at 15 with water. In the sintering operation substantially all of the non-caustic soda of the sludge is converted to sodium aluminate which is dissolved in the leaching system 16 by the diluted causticizer effluent liquor to produce a leaching effluent which is a sodium aluminate enriched caustic liquor having an alumina to caustic soda ratio of 0.60 and a caustic concentration of 170 g./l. The leaching system effluent is also fortified in caustic soda from the soda produced in the sintering operation in excess of the amount combined with the alumina of the ore. This liquor corresponding to Bayer process pregnant liquor may then be cycled to the main plant precipitators for recovery of the alumina, while the causticizer effluent is cycled to the mainline spent liquor system for blending with the high caustic soda concentration liquor obtained from the centrifuge operation and the untreated spent liquor for recycling to the main plant digesters of the continuous Bayer process.

Referring to Figure 2, there is shown one embodiment by which the sludge in the concentrated liquor is separated by selective centrifuging into the two separate fractions, one constituting causticizer feed and the other constituting the feed to the sinter operation as indicated in Figure 1.

The concentrated liquor having the analysis as indicated in Figure 2 and containing the precipitated sludge in the amount of 3% solids by weight is charged through line 18 to a high speed disc-type centrifuge 19 where the sludge is concentrated to a 25% solids slurry discharged as underflow at 21 and the clarified liquor containing only 0.5% solids by weight is recycled to the mainline spent liquor through line 20. The partially concentrated sludge is introduced into a centrifuge of the solid bowl type wherein it is centrifuged at intermediate or moderately slow speeds to produce an underflow 23 of 50% solids by weight containing substantially all of the solids as sodium carbonate as indicated in Figure 1. This constitutes the feed to the causticizer unit. This high solids slurry advantageously contains a minimum amount of alumina having been concentrated to maximum solids content so that the loss of alumina as calcium aluminate upon reaction with lime in the causticizing unit is reduced as far as possible. The overflow from the bowl type centrifuge containing 10% solids by weight and a major portion of the non-alkaline soda or sodium organate compounds is introduced through line 24 to another high speed centrifuge 25 wherein the sludge is concentrated to a 20% solids slurry (by weight). This underflow 26 constitutes the feed to the sinter operation set out in Figure 1. The overflow from centrifuge 25 is passed through line 27 to the mainline spent liquor system along with the overflow from centrifuge 19, both of which contain only 0.5% solids by weight.

It is to be understood that the invention is not limited to the fractionation of the precipitated sludge as indicated in Figures 1 and 2. In certain instances, it may be much more desirable to charge all of the underflow from the centrifuging operation to the sintering operation 12 of Figure 1 without cutting out any portion for direct causticizing in the causticizing unit 10 of Figure 1. Accordingly, whether the centrifuge operation involves merely a single underflow or two separate underflows as indicated in Figures 1 and 2, it is to be understood that the invention embraces the concept of conducting the sintering and leaching operation on the total sludge obtained in the concentrating evaporation of the purification process.

Regardless of the alternative procedure employed in this regard, it may be stated that the present invention as an additional feature thereof provides for the recovery of substantially all of the soda present as non-caustic soda in the sludge separated from the concentrated liquor and in the liquor associated with the thickened sludge. In addition, by conducting the sinter operation on the sludge slurry, substantially all or a major portion of the alumina in the liquor of the slurry is recovered as sodium aluminate in the effluent from the leaching system.

The present invention, as above-described, has its most advantageous application in the production of alumina from aluminous ores containing at least a portion of the available alumina in monohydrate form, and particularly those ores characterized by a relatively large content of red mud residue difficult to settle, that is, those ores in the processing of which the liquor contamination becomes a vital factor. However, it is not intended to limit the invention to any particular type of aluminous ore, since the purification of any circulating caustic aluminate liquor by the process will produce beneficial results in terms of starch consumption, settling rate and alumina precipitation.

Various modifications or equivalent steps may be adopted without departing from the invention as defined by the scope of the appended claims. For example, any suitable means effective to separate the precipitated sludge from the concentrated liquor may be employed, the process not being limited to mechanical features such as centrifuging or filtration, except as to the specific embodiment involving fractional separation of the precipitated sludge. Moreover, the invention cannot be construed as limited to the treatment of the whole or any specific fraction of the circulating process liquor since this merely involves such factors as economics and capacity of equipment. In other words, starting with a previously contaminated liquor and without regard to economics or capacity limitations, the entire liquor stream may be purified in one operation to the desired level of starch consumption considering the type of ore being processed. Alternatively on a more practical basis, a previously contaminated liquor may be gradually purified by subjecting a selected fraction thereof to the purification process per cycle of main Bayer process operations to establish a level of purity in regard to non-caustic soda permitting a desired minimum starch consumption at a practical and adequate red mud settling rate.

For maintaining an established level of purity, only a minor fraction of the liquor per Bayer process cycle need be treated. In actual commercial operation the size of the fraction treated may be determined on the basis of the amount of non-caustic soda to be rectified to caustic soda per cycle. In this regard, the amount of non-caustic soda separated and rectified will vary depending upon the particular treatment i.e., the concentration of caustic soda in the evaporator, and whether process alternatives are employed, such as (1) a holding period for the liquor prior to sludge separation, (2) lime treatment.

Regarding concentration of the caustic soda, it is not intended to limit the invention in its generic aspect to any particular value, but it suffices to state that the liquor must be concentrated sufficiently to obtain the slimy gelatinous precipitate characteristic of the insoluble portion of the non-alkaline soda, a substantial portion of the sodium carbonate of the non-caustic soda inherently salting out at those caustic concentrations effective to precipitate the insoluble sodium organates of the non-alkaline fraction.

Accordingly, the invention is to be construed as to its true scope by the claims appended hereto.

What is claimed is:

1. A process for the production of alumina from aluminous materials, which comprises digesting said materials in caustic soda-containing liquor, said aluminous materials containing organic matter which forms sodium organic compounds in the liquor, removing the insoluble residues of said aluminous materials from the digestion liquor by settling, recovering alumina by precipitation from the clarified liquor, concentrating the spent caustic liquor to a caustic soda concentration sufficient to precipitate a sludge containing sodium organic compounds, adding lime to the concentrated sludge containing liquor and separating the sludge from the liquor whereby to prevent the sodium organic compounds from exerting an inhibiting effect on the settling insoluble residues of said aluminous material from the digestion liquid, and recycling the liquor of reduced settling-inhibiting sodium organic compound content for digestion of additional aluminous material.

2. A continuous process for production of alumina from aluminous materials containing organic matter, which comprises digesting said aluminous materials in recycled spent caustic aluminate liquor, removing the insoluble residues of said aluminous material from the digestion liquor by settling with addition of starch as a flocculating agent, said starch and said organic matter of the aluminous material forming sodium organic compounds and sodium carbonate in the liquor, recovering alumina by precipitation from the clarified liquor, concentrating the spent liquor to a caustic soda concentration sufficient to precipitate a gelatinous sludge of sodium organic compounds and sodium carbonate whereby to prevent accumulation thereof in the liquor in amount sufficient to exert an inhibiting effect on the settling of the insoluble residues from the digestion liquor, separating the sludge from the liquor as a slurry by centrifuging, recycling the sludge-free liquor for digestion of additional aluminous material, said sludge being fractionated during separation from the liquor into a high solids sodium carbonate rich fraction and a low solids sodium organic compound rich fraction, the soda of the sodium carbonate fraction being rectified to caustic soda by direct lime causticizing, and the other fraction is mixed with aluminous material sintered and leached with dilute caustic soda liquor to recover the organic compound soda as sodium aluminate.

References Cited in the file of this patent

UNITED STATES PATENTS

| | | |
|---|---|---|
| 2,280,998 | Brown | Apr. 28, 1942 |
| 2,375,343 | Brown | May 18, 1945 |
| 2,440,378 | Newsome et al. | Apr. 27, 1948 |
| 2,468,207 | Kerr | Apr. 26, 1949 |
| 2,519,362 | Flint et al. | Aug. 22, 1950 |
| 2,522,605 | Cundiff | Sept. 19, 1950 |
| 2,557,629 | Boivent | June 19, 1951 |

OTHER REFERENCES

Sherwin: "Extractive Metallurgy of Aluminum" in "Journal of Metals," April 1950, pages 661 to 667, inclusive.

UNITED STATES PATENT OFFICE
CERTIFICATE OF CORRECTION

Patent No. 2,981,600                                                                     April 25, 1961

John L. Porter

It is hereby certified that error appears in the above numbered patent requiring correction and that the said Letters Patent should read as corrected below.

Column 12, line 11, for "a" read -- at --; column 14, line 23, before "with" insert -- while --; column 16, line 49, for "liquid" read -- liquor --.

Signed and sealed this 24th day of October 1961.

(SEAL)
Attest:

ERNEST W. SWIDER                                           DAVID L. LADD
Attesting Officer                                               Commissioner of Patents

USCOMM-DC